United States Patent [19]

Kroushl, III

[11] Patent Number: 5,227,417
[45] Date of Patent: Jul. 13, 1993

US005227417A

[54] POLYVINYL CHLORIDE BASED PLENUM CABLE

[75] Inventor: Paul W. Kroushl, III, Sheboygan, Wis.

[73] Assignee: Cooper Industries, Inc., Houston, Tex.

[21] Appl. No.: 825,592

[22] Filed: Jan. 24, 1992

[51] Int. Cl.⁵ ............................................. C08K 5/523
[52] U.S. Cl. ................................... 524/114; 428/389; 524/141; 524/143; 524/288; 524/405; 524/406
[58] Field of Search .............. 524/405, 406, 141, 143, 524/288, 114; 428/389

[56] References Cited

U.S. PATENT DOCUMENTS

| | | | |
|---|---|---|---|
| 4,670,494 | 6/1987 | Semenza | 524/405 |
| 4,892,683 | 1/1990 | Naseem | 524/406 |
| 4,965,309 | 10/1990 | Batdorf | 524/406 |
| 5,036,121 | 7/1991 | Coaker et al. | 524/288 |

Primary Examiner—Veronica P. Hoke
Attorney, Agent, or Firm—Laff, Whitesel, Conte & Saret

[57] ABSTRACT

A composition for a polyvinyl chloride based plenum cable jacketing material comprising: polyvinyl chloride resin, a phosphate ester based plasticizer, a brominated aromatic ester plasticizer, epoxidized soybean oil, alumina trihydrate, ammonium octamolybdate; zinc molybdate, a lead based stabilizer, and stearic acid and paraffin lubricants that are efficacious in polyvinyl chloride.

5 Claims, No Drawings

POLYVINYL CHLORIDE BASED PLENUM CABLE

FIELD OF THE INVENTION

This invention relates to a plenum cable and to its insulating and flame-retardant composition. More particularly, this invention relates to a plenum cable for use in wire insulation and cable jacketing and further to its insulating, flame-retardant polyvinyl chloride based composition.

BACKGROUND OF THE INVENTION

Polyvinyl chloride is widely used for wire insulation and plenum cable jacketing because of its insulating and flame and smoke retardant properties. For example, it has been recognized that the use of polyvinyl chloride in wire insulations and cable jacketing reduces the hazards of flammability, toxic decomposition and smoke in the event of a fire. In addition, polyvinyl chloride is especially desirable because of its low cost. Likewise, the use of fluorocarbon for similar purposes is a viable alternative to polyvinyl chloride but is not as desirable due to its relatively high cost.

To date, there are presently several polyvinyl based compositions that are used to insulate wires and cables, including U.S. Pat. No. 4,892,683 which discloses a composition that includes chlorinated polyvinyl chloride or chlorinated polyethylene and U.S. Pat. No. 4,670,494 which discloses a composition that includes chlorinated polyvinyl chloride. The aforementioned patents, however, generally require chlorinated polyvinyl chloride (CPVC) and chlorinated polyethylene (CPE) as an essential ingredient and generally have inferior flame and smoke retardant properties.

While the previously mentioned polyvinyl and fluorocarbon compositions are relatively adequate flame retardants and insulators, there are problems associated with their use. One such problem is that the known compositions generally include high levels of plasticizers which are necessary for flexibility and good processing properties but which generally increase the flammability of the polyvinyl chloride compositions. Another problem is that these compositions process slower and therefore, decrease the output of cable. In addition, these known compositions have approximately 30% more spark test failures.

SUMMARY OF THE INVENTION

Accordingly, it is an object of the present invention to provide a plenum cable composition being substantially free of chlorinated polyvinyl chloride and chlorinated polyethylene and having excellent flame and smoke retardant properties.

Another object of the present invention is to provide a polyvinyl chloride plenum cable jacket that has at least two smoke suppressants which interact synergistically.

The objectives and advantages of the present invention are achieved, in a preferred embodiment, by providing a composition for a polyvinyl chloride based plenum cable which includes polyvinyl chloride resin, plasticizers, stabilizers, flame retardants and smoke suppressants, and lubricants. The use of more than one smoke suppressant and being free of chlorinated polyvinyl chloride and chlorinated polyethylene provides an improved electrical cable jacket.

DETAILED DESCRIPTION OF THE INVENTION

The present invention provides a polyvinyl chloride plenum cable having a polyvinyl chloride resin jacket. The polyvinyl chloride resin contains at least one plasticizer, at least one flame retardant and at least two smoke suppressants. Alternatively, the polyvinyl chloride resin may include smoke suppressants that also act as flame retardants.

In one embodiment, the cable jacket is manufactured by extruding a polyvinyl chloride cable jacket composition having 100 parts by weight of the polyvinyl chloride resin, from about 15 to about 70 parts by weight of flame retardant plasticizers per hundred parts by weight of polyvinyl chloride resin, from about 6 to about 80 parts by weight of smoke suppressant and/or flame retardants per hundred parts by weight of polyvinyl chloride resin. Hereinafter, we will use the abbreviation phr to denote parts by weight per hundred parts by weight of polyvinyl chloride.

In another embodiment, the cable jacket composition also has from about 20 to about 45 phr of alumina trihydrate and from about 5 to about 15 phr of a heat stabilizer selected from tribasic lead sulfate, lead phthalate, dibasic lead phosphite, and mixtures thereof, and less than about 2 phr of lubricants which are efficacious in a polyvinyl chloride mixture.

The present invention, in the preferred embodiment, contemplates preparing a composition by mixing together the following ingredients: polyvinyl chloride resin; plasticizers, stabilizers, flame retardants and smoke suppressants, and lubricants. Synergism occurs between the smoke suppressants. The specifics of each ingredient is explained in greater detail below.

In the preferred embodiment, the plenum jacket composition contains 100 parts by weight of polyvinyl chloride resin. The polyvinyl chloride resin is of medium molecular weight and may be purchased from the B. F. Goodrich Co., Cleveland, Ohio. It is commonly sold under the name BFG Geon 30.

The flame retardant plasticizer is at least a two component plasticizer system. The first plasticizer is a low-smoke, flame-retardant phosphate ester based plasticizer. It is sold under the name of Santicizer 2148 by Monsanto Chemicals Co., St. Louis, Mo. Santicizer 2148 should be present in the composition in an amount from about 10 to about 40 phr, but preferably at about 30 phr.

The second plasticizer is a brominated aromatic ester which is used as a flame retardant. It is present in the mixture in an amount from about 10 to about 30 parts per weight but preferably at 20 parts per weight. It is known as Atochem Pyronil 45 which is sold by Atochem North America, Inc., Somerville, N.J.

A polyvinyl chloride stabilizer is preferably present in the composition. The stabilizer is an epoxidized soybean oil which improves the stability of the compound if there is residual zinc oxide in the zinc molybdate and is used in the composition is in an amount from about 1 to about 10 phr, but preferably about 3 phr. The oil may be purchased from Witco Chemicals; Chicago, Ill.

Alumina trihydrate is also present in the plenum jacket composition as an additional flame retardant in an amount from about 20 to about 45 phr and preferably about 30 phr. This ingredient is sold by the Nyco Corporation, Willsboro, N.Y., under the name of Nycoat 10734.

A synergistic mixture of smoke suppressants are part of the plenum jacket composition. The two smoke suppressants used are ammonium octamolybdate and a zinc molybdate. However, the smoke suppressants may comprise other zinc compounds, such as zinc borate, zinc oxide, zinc phosphate, as long as ammonium octomolybdate is present in the mixture.

The ammonium octamolybdate is a flame retardant and smoke suppressant and is used in an amount from about 5 to about 40 phr. In the preferred embodiment, it is used at about 30 phr. Ammonium octamolybdate is made by Climax Polymers, Greenwich, Conn., under the name of Climax AOM.

The zinc molybdate is a smoke suppressant and flame retardant and is a molybdenum-based compound. It is present in the mixture in an amount from about 1 to about 40 phr and about 10 phr in the preferred embodiment. It is made by Sherwin Williams, Coffeyville, Kan., and is known as Kemgard® 911C.

The plenum cable jacket composition further includes a lead based stabilizer, such as Anzon Tribase E which is tribasic lead sulfate, in an amount from about 5 to about 15 phr. In the preferred embodiment, there are about 7.0 phr present. The sulfate is made by Synthetic Products, Cleveland, Ohio, under the name of Anzon Tribase E (80% in chlorinated polyethylene).

Finally, lubricants which are efficacious in polyvinyl chloride are present in the preferred cable jacket composition. In the preferred embodiment, about 0.5 phr of stearic acid and about 0.5 phr of paraffin are used. They may be purchased from Witco Chemicals.

The following Example illustrates the effectiveness of the inventive composition.

EXAMPLE 1

Six different polyvinyl chloride formulations as set forth infra in Table 1 were evaluated for smoke density and oxygen index. The first formulation was a commercially available product known as 3000D and made by Gary Chemicals and was used as a control sample. Formulation 2 was the inventive composition herein. Formulations 3 and 4 generally comprised the inventive composition but included different flame retardants, with formulation 3 having Pyronil 45 and formulation 4 having PB-460 by the FMC Corporation. Likewise, formulations 5 and 6 included different plasticizers, with formulation 5 containing Santicizer 2148 and formulation 6 containing Jayflex 4210 made by Exxon Corporation.

TABLE 1

|  |  | 1 | 2 | 3 | 4 | 5 | 6 |
|---|---|---|---|---|---|---|---|
| PVC | G | 100.0 | 100.0 | 100.0 | 100.0 | 100.0 | 100.0 |
|  | A | — | — | — | — | — | — |
| Santicizer 2148 | R | 30.0 | 30.0 | 42.0 | 42.0 | — | 0.0 |
| Exxon 4210 | Y | 0.0 | 0.0 | 0.0 | 0.0 | 0.0 | 42.0 |
| Pyronil 45 |  | — | 20.0 | 20.0 | 0.0 | 0.0 | 0.0 |
| PB-460 | G | 0.0 | 0.0 | 0.0 | 15.0 | 15.0 | 15.0 |
| Epoxidized soybean oil | W | 3.0 | 3.0 | 3.0 | 3.0 | 3.0 | 3.0 |
|  | 3 | — | — | — | — | — | — |
| Aluminum trihydrate | 0 | 30.0 | 30.0 | 30.0 | 30.0 | 30.0 | 30.0 |
| Ammonium octamolybdate | 0 | 30.0 | 30.0 | 30.0 | 30.0 | 30.0 | 30.0 |
| Tribasic Lead Sulfate | 0 | 7.0 | 7.0 | 7.0 | 7.0 | 7.0 | 7.0 |
| Stearic Acid | D | 0.5 | 0.5 | 0.5 | 0.5 | 0.5 | 0.5 |
| Aristowax |  | 0.5 | 0.5 | 0.5 | 0.5 | 0.5 | 0.5 |
| Kemgard® 911C (in phr) |  | 10 | — | 10 | — | — | — |

TABLE 1-continued

|  | 1 | 2 | 3 | 4 | 5 | 6 |
|---|---|---|---|---|---|---|
| LSFR ™ in parts per hundred | — | 7 | — | — | — | — |
| Film Thickness (mil) | 49 | 66 | 45 | 43 | 43 | 44 |
| Flame Retardant Results |  |  |  |  |  |  |
| Oxygen Index (%) | 52.8 | 44.8 | 49.1 | 42.3 | 40.0 | 40 |
| Smoke Density (Dm/g) | 21.0 | 18 | 20 | 20 | 20 | 38 |

LSFR is a low smoke flame retardant which is made by Laurel Industries, Cleveland, Ohio.

Formulation #6, listed in the above table, was prepared into a 40 mil vinyl film on the Thropp Two Roll Mill for four minutes at 325° F. Flame retardant and flame suppressing properties were evaluated using the Oxygen Index Test, ASTM D6833, and the Smoke Density Test, ASTM D662.

The above six formulations, which were analyzed for their smoke density and oxygen index, revealed that formulation 1 had the highest oxygen index of 52.8% with a smoke density of 21 Dm/g. Formulation 2 yielded an oxygen index of 44.8% and a smoke density of 18 Dm/g. Formulation 3 yielded a higher oxygen index (49.1%) compared to formulation 4 which had an oxygen index of 42.3%. However, both formulations had the same smoke density. Formulations 5 and 6 yielded the same oxygen index (40.0%) but formulation 5 had a lower smoke density (20 Dm/g) than formulation 6 which was 38 Dm/g.

EXAMPLE 2

Another plenum cable jacket composition was prepared having the following composition.

| Geon 30 PVC Resin | 100.0 phr |
|---|---|
| Santicizer 2148 | 30.0 phr |
| Pyronil 45 | 20.0 phr |
| Epoxidized Soybean Oil | 3.0 phr |
| Aluminum Trihydrate | 30.0 phr |
| Ammonium Octamolybdate | 30.0 phr |
| Zinc Molybdate | 10.0 phr |
| Tribasic Lead Sulfate | 7.0 phr |
| Stearic Acid | 0.5 phr |
| Paraffin Wax | 0.5 phr |

This composition used tribasic lead sulfate instead of lead phthalate.

The foregoing is for purposes of illustration rather than limitation of the scope of protection accorded this invention. The latter is to be measured by the following claims, which should be interpreted as broadly as the invention permits.

The invention claimed is:

1. A flame retardant low smoke composition being substantially free of chlorinated polyvinyl chloride and chlorinated polyethylene comprising:
   100 parts by weight of a polyvinyl chloride resin;
   a phosphate ester based plasticizer, in an amount from about 10 to about 40 phr;
   a brominated aromatic ester plasticizer, in an amount from about 10 to about 30 phr;
   epoxidized soybean oil, in an amount from about 1 to about 10 phr;
   alumina trihydrate, in an amount from about 20 to about 45 phr;

ammonium octamolybdate, in an amount from about 5 to about 40 phr;

zinc molybdate, in an amount from about 1 to about 40 phr;

a lead based stabilizer, in an amount from about 5 to about 15 phr; and stearic acid and paraffin lubricants that are efficacious in polyvinyl chloride, each in an amount from about 0.2 to 0.7 phr.

2. The composition of claim 1 comprising:

about 100 parts by weight of polyvinyl chloride resin;
about 30 parts by weight of a phosphate ester based plasticizer;
about 20 parts by weight of a brominated aromatic ester plasticizer;
about 3 parts by weight of epoxidized soybean oil;
about 30 parts by weight of alumina trihydrate;
about 30 parts by weight of ammonium octamolybdate;
about 10 parts by weight of zinc molybdate;
about 7.0 parts by weight of a lead based stabilizer;
about 0.5 parts by weight of stearic acid; and
about 0.5 parts by weight of paraffin.

3. The composition of claim 1 wherein:

said lead based stabilizer is selected from the group consisting of tribasic lead sulfate, lead phthalate, dibasic lead phosphite and mixtures thereof.

4. A jacketed electrical cable comprising at least one electrical cable and a cable jacket about said electrical cable, said cable jacket being prepared from a polyvinyl chloride flame retardant composition being substantially free of chlorinated polyvinyl chloride and chlorinated polyethylene comprising:

about 100 parts by weight of polyvinyl chloride;
from about 5 to about 15 parts by weight of a lead based stabilizer wherein said lead based stabilizer is selected from the group consisting of tribasic lead sulfate, lead phthalate, dibasic lead phosphite and mixtures thereof;
from about 1 to about 40 parts by weight of zinc molybdate;
from about 5 to about 40 parts by weight of ammonium octamolybdate;
from about 20 to about 70 parts by weight of flame retardant plasticizer efficacious in PVC-based plastic materials said plasticizer consisting of from about 10 to about 40 parts weight of a phosphate ester based plasticizer and from about 10 to about 30 parts by weight of a brominated aromatic ester;
at least one lubricant efficacious in PVC-based plastic materials;
an additional polyvinyl chloride stabilizer, and
from about 20 to about 45 parts by weight of aluminum trihydrate.

5. The jacket of claim 4 comprising:

about 100 parts by weight of polyvinyl chloride resin;
about 30 parts by weight of a phosphate ester based plasticizer;
about 20 parts by weight of a brominated aromatic ester plasticizer;
about 3 parts by weight of epoxidized soybean oil;
about 30 parts by weight of alumina trihydrate;
about 30 parts by weight of ammonium octamolybdate;
about 10 parts by weight of zinc molybdate;
about 8.8 parts by weight of a lead based stabilizer;
about 0.5 parts by weight of stearic acid; and
about 0.5 parts by weight of paraffin.

* * * * *